Aug. 14, 1962    P. C. WRIGHT ET AL    3,049,333
PIPE LINE STOPPER

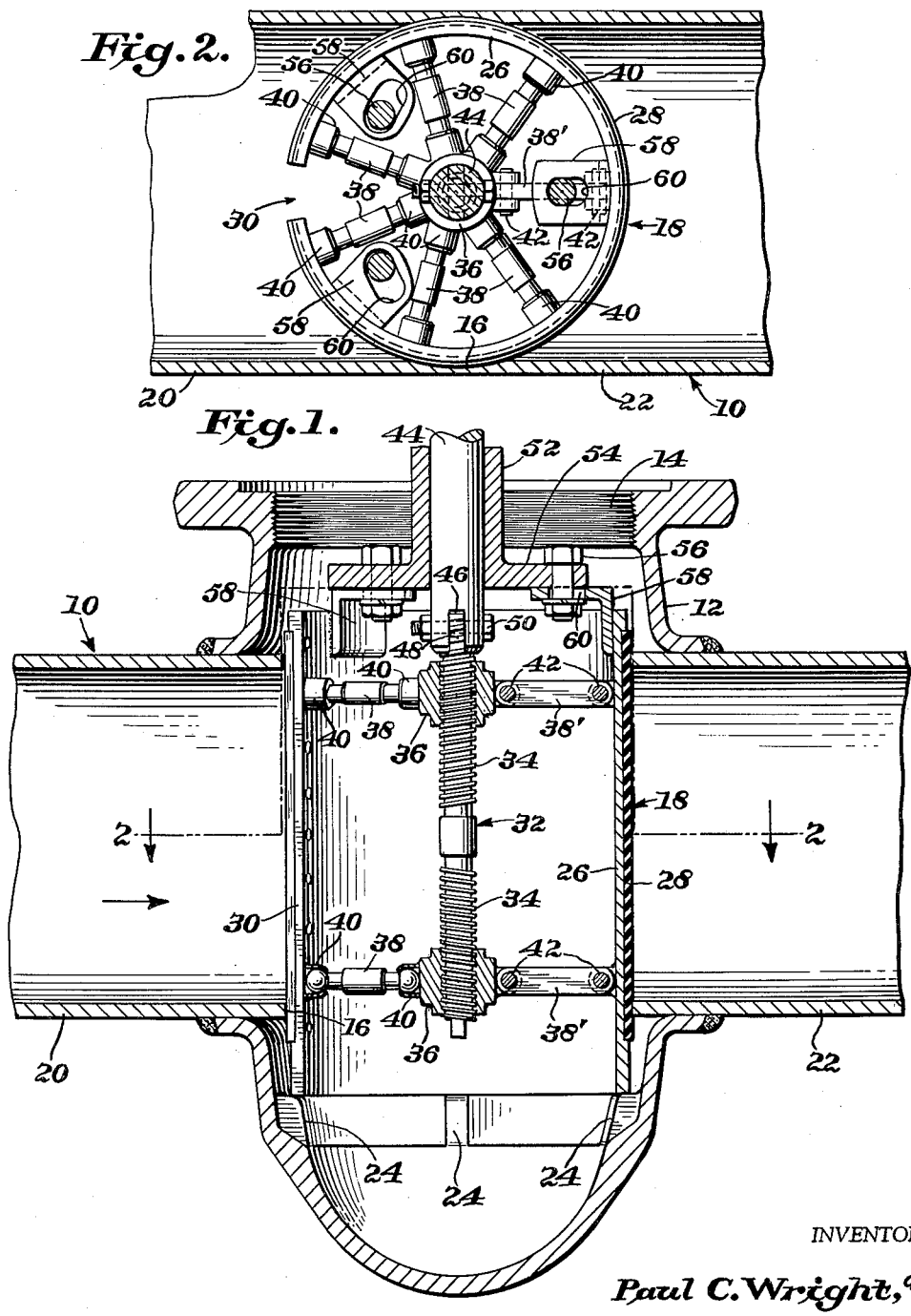

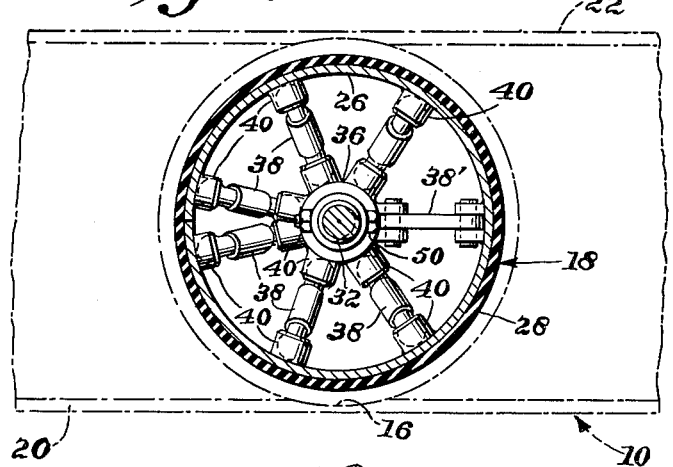
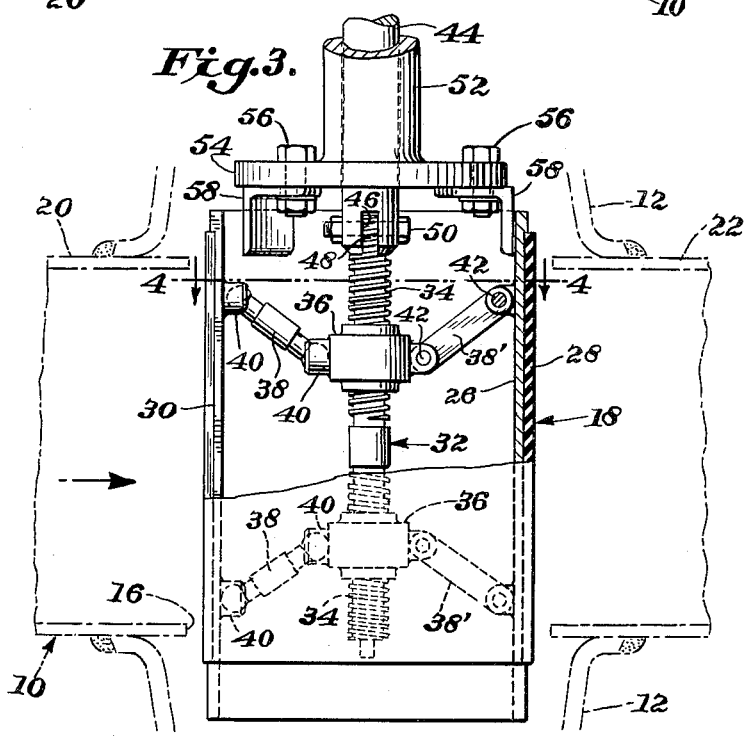

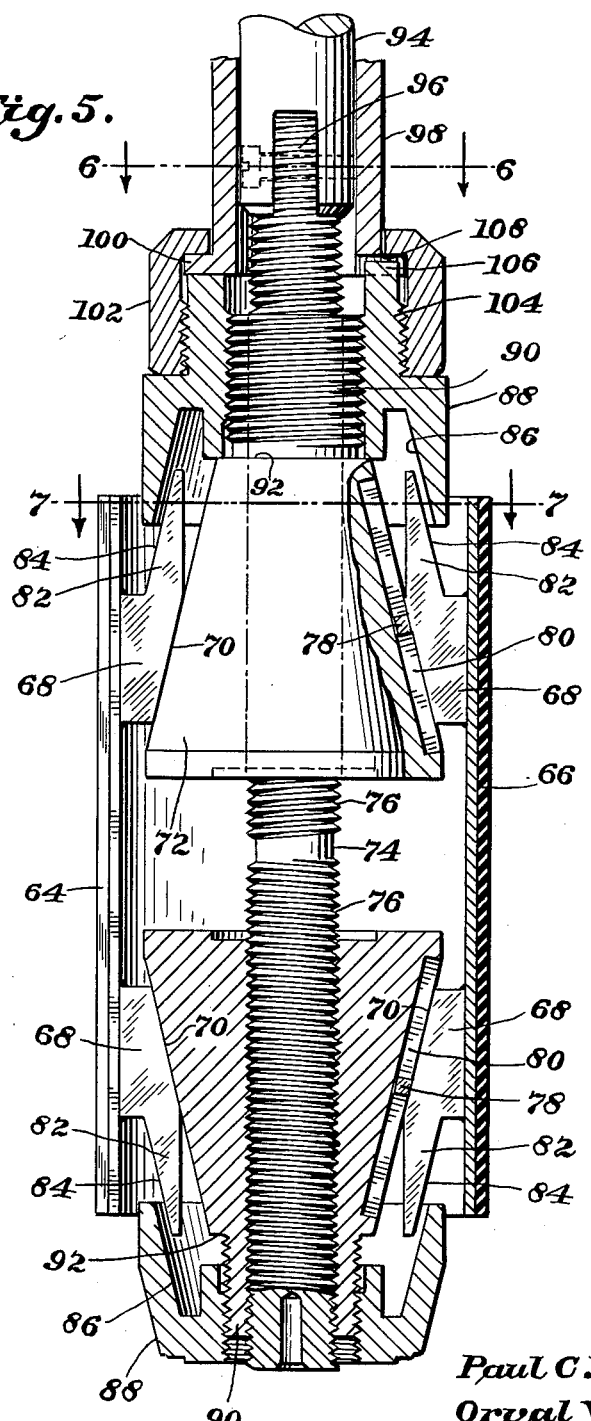

Filed Oct. 9, 1958    4 Sheets-Sheet 4

BOTTOM

INVENTORS:
Paul C. Wright,
Orval V. Chambers,
BY Cushman, Darby & Cushman
ATTORNEYS.

United States Patent Office 3,049,333
Patented Aug. 14, 1962

3,049,333
PIPE LINE STOPPER
Paul C. Wright and Orval V. Chambers, both % El Paso
Natural Gas Co., El Paso, Tex.
Filed Oct. 9, 1958, Ser. No. 766,335
1 Claim. (Cl. 251—158)

This invention relates to pipe line stoppers of the expanding sleeve type adapted to be inserted in a transverse circular cut-out portion of a pipe and expanded to stop the flow of fluid therethrough. More particularly, this invention relates to improvements in expansible sleeve pipe stoppers of the general type disclosed, for example, in the patent to Smith No. 2,655,339 and to Koenig No. 2,740,606.

Each of the stoppers disclosed in the aforementioned patents comprises a longitudinally split, flexible cylindrical metal sleeve of rather springy material such as sheet steel or the like, provided with an exterior covering of rubber or other suitable sealing material to provide an effective seal with the edges of the cut-out portion of the pipe. Each stopper is provided with an interior wedging mechanism for positively expanding the sleeve into sealing relationship with the edges of the cut-out portion of the pipe. No means are provided, however, for positively contracting the sleeve out of such sealing relationship. Contraction of the sleeve occurs, on relief of the expansive forces therewithin, only because of the inherent resiliency of the sleeve and because the latter, when relaxed, is of slightly smaller diameter than the cut-out opening through the pipe.

The aforedescribed construction gives rise to a difficulty. In normal operation, the split in the stopper sleeve is disposed on the upstream side of the line so that fluid pressure augments interior mechanical expansive mechanisms in expanding the sleeve into sealing engagement with the edges of the cut-out portion of the pipe. In the event that the pipe is conveying fluid under high pressure, once the seal is effected a large pressure differential will exist across the downstream side of the stopper sleeve. This pressure differential may be, in some instances, so high as to prevent contraction of the stopper sleeve by its inherent resilience on relief of the interior mechanical expansive forces. In such an event, if the pressure differential is not equalized, removal of the stopper from the cut-out portion of the pipe becomes extremely difficult and can be accomplished only with severe damage to the rubber covering of the stopper sleeve.

This problem was recognized in the aforementioned Koenig patent and was attempted to be solved by the provision of an equalizing valve controlling an equalizing passageway through the downstream side of the stopper sleeve, i.e., generally opposite the longitudinal split therein. This construction, while effective for its intended purpose, necessitates the provision of mechanical control mechanism extending to the exterior of the usual stopper bell of a stopping machine, as illustrated in the aforementioned Koenig patent. The provision of such a control mechanism for an equalizing valve, as well as the provision of such a valve, not only gives rise to complications of design and manufacture, but also greatly increases the expense of the complete stopper assembly. Moreover, because such a valve must, of necessity, be relatively small as compared to the size of the pipe controlled by the stopper, a relatively long period of time is necessary to equalize a large pressure differential across an expanded and flow-shutting-off stopper even after an equalizing valve has been opened.

Accordingly, it is an object of this invention to provide an improved mechanism for operating an expansible stopper of the split sleeve type, which mechanism is operative to positively contract as well as to positively expand the stopper.

It is another object of this invention to provide an improved stopper assembly of the split sleeve type which can be selectively operated by mechanical means to positively expand or positively contract the stopper.

It is a further object of this invention to provide an improved operating mechanism for an expansible sleeve pipe line stopper that not only will effect positive expansion or positive contraction of the stopper, but also is relatively inexpensive to manufacture and simple to operate.

Other objects and advantages of the invention will become apparent from the following description and accompanying drawings in which:

FIGURE 1 is an elevational sectional view showing a pipe line stopper embodying this invention operatively associated with a pipe line and expanded into flow stopping position therein.

FIGURE 2 is a sectional view taken substantially on line 2—2 of FIGURE 1.

FIGURE 3 is a view corresponding to FIGURE 1 but illustrating the stopper in contracted position.

FIGURE 4 is a sectional view taken substantially on line 4—4 of FIGURE 3.

FIGURE 5 is an elevational sectional view of a modified form of pipe line stopper embodying this invention, and illustrating the stopper in expanded condition.

Figure 6:
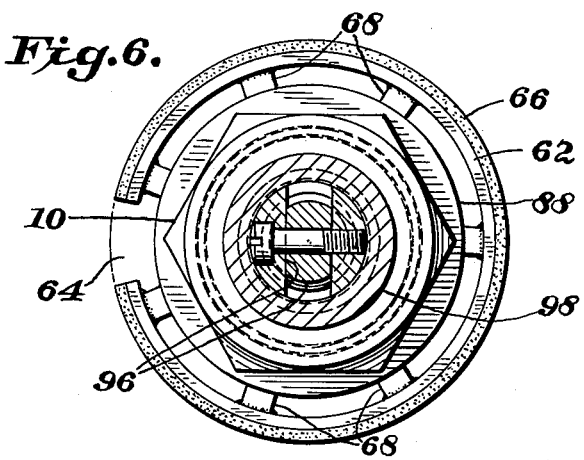
FIGURE 6 is a sectional view taken substantially on line 6—6 of FIGURE 5.

Referring now to the drawings, there is shown in FIGURE 1 a section of a pipe line 10 having secured thereto, as by welding or the like, a conventional stopper fitting 12. One end of the fitting 12 is provided with a flanged opening 14 disposed in alignment with a transverse circular bore or cut-out 16 that was cut through pipe 10, by conventional apparatus, after the fitting was secured to the line. As shown in FIGURE 2, the diameter of the cut-out 16 is at least slightly greater than the inside diameter of the pipe 10. The fitting 12, as is disclosed, for example, in the aforementioned Smith patent, is adapted to have connected thereto a control valve (not shown) to which is adapted to be secured the stopper barrel or bell of a stopping machine (not shown).

An expansible sleeve pipe stopper 18 embodying this invention is shown in expanded position within the cut-out portion 16 of the pipe line 10 to stop the flow of fluid from the upstream pipe section 20 to the downstream pipe section 22. A plurality of lugs 24 are arranged within the lower part of the stopper fitting 12, i.e., opposite the flanged opening 14, for engagement by the stopper 18, in order to properly position the latter axially within the cut-out portion 16 of the pipe 10. The stopper 18 comprises a cylindrical metal sleeve 26, which may, but need not necessarily, be of a rather springy material such as sheet steel. The exterior of the sleeve 26 is provided with a flexible covering 28 of rubber or other suitable sealing material for engagement with the edges of the cut-out portion 16 of the pipe 10 to provide an effective seal therewith, as shown in FIGURES 1 and 2. The sleeve 26 has a longitudinal slot 30 and is constructed so that when contracted, as shown in FIGURES 3 and 4, the sleeve is of slightly smaller over-all exterior diameter than that of the cut-out portion 16 or transverse circular opening through the pipe 10.

Coaxially disposed within the interior of the sleeve 26 is a jack screw 32 having two sets of threads 34 of opposite direction on which are mounted nut members 36. Each nut member 36 is provided with a set of equi-length, generally radially extending, stubstantially uniformly spaced toggle arms 38 that are pivotally connected to both the corresponding member and to the interior side of the sleeve 26 adjacent one end thereof for pivotal movement in planes that include the axis of the screw 32. Preferably, the connections of all but one of the arms 38 of a set are formed by ball and socket joints 40, so that limited pivotal movement of the arms about the axis of each nut member 36 can take place as occasioned by contraction and expansion of the sleeve 26 as later explained.

It will be particularly noted that two of the arms 38 of each set are connected to the sleeve 26 preferably closely adjacent and on opposite sides of the slot 30 therein, while one of the toggle arms of each set, preferably an arm 38' disposed substantially opposite the slot in the sleeve, is connected to the latter and to the corresponding nut member 36 by pivot pins 42 that preclude pivotal movement of the arm 38' relative to the sleeve or to the corresponding nut member in any direction save about the axis of the pivot pins. Thus, the pivot pins 42 and arms 38' preclude any relative coaxial rotation between the nut members 36 and the sleeve 26. While seven toggle arms 38 in each set have been illustrated in the drawings, it will be realized that a greater or lesser number of arms can be used, depending on the size of the sleeve 26.

From the foregoing construction, it will be seen that if the jack screw 32 is rotated in one direction relative to the nut members 36, the latter will be moved apart so as to expand the sleeve 26, substantially uniformly along its length and about its circumference, by the expansive forces exerted thereon by the toggle arms 38, as shown in FIGURES 1 and 2. Likewise, rotation of the jack screw 32 in the opposite direction will serve to move the nut members 36 toward each other and thereby exert positive contractural forces on the sleeve 26 through the action of the toggle arms 38, as best shown in FIGURES 3 and 4.

Rotation of the jack screw 32 may be accomplished by an operating rod 44 that may be detachably connected to the upper end of the jack screw and which extends upwardly through the flanged opening 14 in the fitting 12. The rod 44 as shown in the aforementioned patents, is adapted to extend through the aforementioned control valve and stopper bell to the exterior of the latter for manual manipulation. The connection between the rod 44 and the screw 32 may be effected by any appropriate means, but is shown here as a bifurcation 46 on the end of the rod that receives a flattened tongue 48 on the end of the screw, the parts being secured together by a transverse bolt and nut 50.

The stopper 18 may be moved axially into and out of the cut-out portion 16 of the pipe 10 and also rotated to properly orient the slot 30 within the pipe 10 by means of an orienting tube 52 which snugly surrounds the operating rod 44 and also is adapted to extend to the exterior of the aforementioned stopper bell for manual manipulation. The lower end of the orienting tube 52 is connected to the stopper sleeve 26 by means of a spider-like arrangement comprising an exterior circumferential flange or plate 54 on the lower end of the tube that is secured, as by bolts and nuts 56 extending parallel to the axis of the tube, to three radially inwardly extending lugs or brackets 58 welded, or otherwise suitably secured, to the upper interior portions of the stopper sleeve. It will be noted that the lugs 58 have elongated slots 60 through which the bolts 56 extend and such slots are elongated in directions suitable to accommodate movement of the lugs occasioned by expanding and contracting movements of the stopper sleeve 26. Thus, for example, two such lugs 58 are secured to the stopper sleeve 26 relatively closely adjacent and on opposite sides of the slot 30 therein and the slots in such lugs extend at an acute angle (greater than 45°) to a plane which includes the axis of the stopper sleeve and extends mid-way between the edges of the sleeve slot. Similarly, the third lug 58 is secured to the sleeve 26 at a location substantially opposite the slot 30 therein and the slot 60 in such lug is elongated generally within the aforementioned plane.

In operation, the stopper 18 is pushed downwardly, from within the aforementioned stopper bell, by means of the orienting tube 52 until the bottom edge of the sleeve 26 contacts the positioning lugs 24 in the lower part of the stopper fitting 12. The tube 52 is then rotated, if necessary, to position the slot 30 on the upstream side of the line 10, as shown in the aforementioned Smith patent. The tube 52 is then held in this position while the operating rod 44 is turned to rotate the jack screw 32 in a direction to produce opposite axial movement of the nut members 36 away from each other to thereby effect expansion of the sleeve 26 into sealing engagement with the edges of the transverse opening 16 through the pipe 10, as shown in FIGURES 1 and 2. In this connection, it will be noted again that the slots 60 in the brackets 58 permit the sleeve 26 to expand without binding against the bolts 56.

As previously stated, upstream line pressure will aid in expanding the sleeve 26 against the edges of the opening 14 through the pipe 10 and also serves to hold the sleeve securely against the downstream edges of such opening to thereby provide a tight seal and prevent any leakage of fluid to the downstream section 22 of the pipe. Of course, the larger the pressure differential across the sleeve 26, the tighter it will engage with the downstream edges of the opening 14 through the pipe and the greater will be the expansive and sealing forces exerted by fluid pressure on the sleeve.

It will be seen, however, that rotation of the jack screw 32 by the operating rod 44 in a direction to effect movement of the two nut members 36 toward each other will effect a toggle action of the arms 38 that will exert a contractive force on the sleeve 26 sufficiently great to overcome even the highest pressure differentials across the sleeve encountered in actual service. Positive contraction of the sleeve 26 in this manner will serve to break the seal with the edges of the cut-out portion 16 of the pipe and full contraction of the sleeve, as shown in FIGURES 3 and 4, opens up a relatively large unobstructed area within the pipe 10, so that the pressure differential will be equalized rapidly. After such equalization, it will, of course, be easy to withdraw the entire stopper assembly from the cutout portion 16 of the pipe line 10 by means of the orienting tube 52.

Although the stopper assembly illustrated in FIGURES 1–4 of the drawings has been shown as being provided with two sets of toggle arms 38 connected to the sleeve 26 adjacent the opposite ends thereof, it will be understood that such an arrangement is for the purpose of assuring contraction and expansion of the sleeve substantially uniformly throughout its entire length. Depending upon the proportions of the sleeve, i.e., length to diameter ratio, wall thickness, etc., it will be seen that more than two sets of toggle arms could be utilized, and, in some instances, even a single set of toggle arms operated by a single nut member would suffice. Moreover, it will be seen that the arms 38 and nut members 36 could be arranged so that movement of the latter toward each other would expand the sleeve 26.

Figure 7:
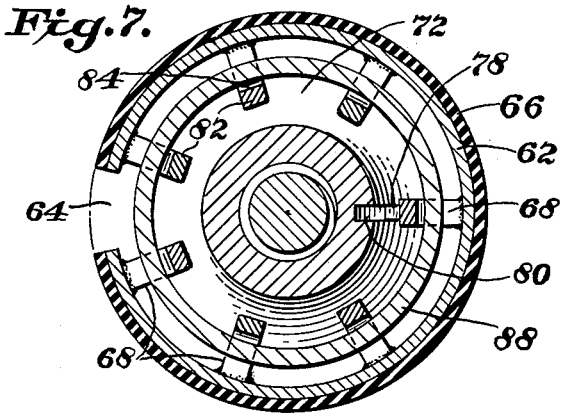
FIGURE 7 is a sectional view taken substantially on line 7—7 of FIGURE 5.
Figure 8:
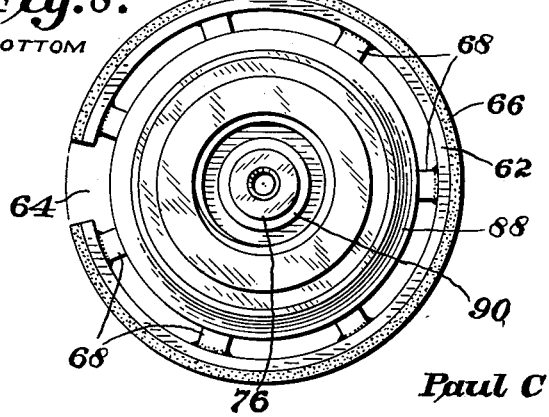
FIGURE 8 is a bottom view of the stopper illustrated in FIGURE 5.

Referring now to FIGURES 5 to 8 of the drawings, there is shown a modified form of this invention, wherein wedging means are employed to positively both expand and contract a stopper sleeve. The stopper again comprises a cylindrical sleeve 62 having a longitudinal slot 64 and a flexible covering 66 of suitable sealing material, similar to the embodiment illustrated in FIGURES 1–4. Secured to the interior of the sleeve 62, as by welding, are two sets of evenly circumferentially spaced inwardly extending radial webs or vanes 68, one set being located adjacent each end of the sleeve. A portion 70 of the length of the inner edges of the vanes 68 of each set are inclined to the axis of the sleeve 62, with the edge portions 70 of each set being inclined in opposite directions. Thus, there is provided two sets of wedging surfaces 70 cooperative with complementary wedging surfaces formed by the exterior of a pair of frusto-conical wedging elements or nut members 72. From the construction illustrated it will be seen that opposite axial movement of the two wedging elements 72 away from each other will be effective to produce a mutual wedging action with the vanes 68 that will expand the sleeve 62 tightly against the inner edges of a transverse circular opening through a pipe.

Opposite axial movement of the wedging elements 72 is accomplished by means of a jack screw 74 positioned coaxially within the sleeve 62 and having two sets of threads 76 of opposite direction which are engaged with complementary threads on the corresponding wedging elements or nut members 72. In order to maintain the wedging elements 72 against rotation while the jack screw 74 is being rotated, the inner inclined edge portion 70 of one of the vanes 68 of each set is provided with a radially inwardly extending key-like projection 78 of less width or thickness than the corresponding vane. This projection 78 slidably engages within a longitudinal slot or key-way 80, of corresponding width, in the corresponding vane 68. When rotating the jack screw 74 to expand or contract the sleeve 62, as later explained, one of the wedging elements 72 is held fixed against rotation, and thereby will maintain the sleeve and the other wedging element fixed against rotation, by means of the interfitting projections 78 and grooves 80.

In order to effect positive contraction of the sleeve 62 in order to equalize a pressure differential thereacross in the same manner as described above with reference to the embodiment illustrated in FIGURES 1–4, the outer ends of the vanes 68 of each set are provided with outwardly projecting tongues 82 that are spaced inwardly from the inner surface of the sleeve and have radially outwardly facing edges 84 that are inclined to the axis of the sleeve in the same direction as the inclination of the corresponding inner edge portions 70. These inclined outer edges 84 of the tongues 82 likewise form wedging surfaces cooperative with corresponding concavo-frusto-conical wedging surfaces 86 formed by the skirt portions of cap-like members 88 that are threadedly engaged with reduced extensions 90 on the wedging elements 72 at the smaller or outer ends of the latter.

When the wedging elements 72 are engaged with the inclined edge portions 70 of the vanes 68, the wedging surfaces 86 of the cap-like members 88 are spaced from the complementary inclined edges 84 of the tongues 82, as shown in FIGURE 5. It will be seen, however, that rotation of the jack screw 74 in a direction to move the wedging elements 72 toward each other will eventually disengage the latter from the edge portions 70 of the vanes 68 and engage the wedging surfaces 86 of the cap-like members 88 with the inclined edges 84 of the tongues 82 so that continued movement of the wedging elements 72 and cap-like members 88 toward each other will result in a mutual wedging action between the wedging surfaces 86 and the inclined edges 84 that will be effective to positively contract the sleeve 62.

Preferably the upper cap-like member 88 is tightly threaded upon the extension 90 of the upper wedging element 72, so that the cap-like member 88 engages against a shoulder 92 formed at the junction of the threaded extension and the main body of the wedging element. In this position of the parts, the desired spacing between the upper cap-like member 88 and the corresponding tongue edges 84 will obtain when the upper wedging element 72 is engaged with the inclined inner edge portions 70 of the vanes 68. The lower wedging element 72 is provided with a similar shoulder 92, but the lower cap-like member 88 preferably is not engaged therewith and can be adjusted axially on the extension 90 of the lower wedging element in order to provide a spacing between the wedging surfaces 86 of the lower cap-like member and the corresponding tongue edges 84 that will correspond to the like spacing between the upper cap-like member and corresponding tongue edges. Consequently, both cap-like members 88 will engage both sets of tongue edges 84 simultaneously in order to contract the sleeve 62 substantially uniformly along its length.

An operating rod 94 is detachably connected to the jack screw 74 by a bolted bifurcation and tongue arrangement 96 similar to that illustrated in the embodiment shown in FIGURES 1–4. Additionally, an orienting tube 98 surrounds the operating rod 94 and has an exterior circumferential flange 100 on its lower end that is engaged by a coupling nut 102 threaded onto an exteriorly threaded extension 104 of the upper cap-like member 88, to thus detachably secure the orienting tube to the entire stopper assembly. An interfitting tongue 106 and slot 108 are provided on the lower end of the tube 98 and the upper end of the member extension 104, respectively, to prevent relative rotation between the tube and the upper cap-like member 88. Consequently, because the upper cap-like member is tightly threaded against the shoulder 92 on the upper wedging element 72, the latter may be held against rotation by the orienting tube 98 during rotation of the jack screw 74 by the operating rod 94.

The operation of this modification of the invention to stop off flow through a pipe is substantially the same as described above with respect to the first disclosed embodiment. Again it will be pointed out, however, that the modification illustrated in FIGURES 5–8 can be operated to provide positive mechanical contraction of the stopper sleeve 62 to thereby break any seal thereof with the edges of an opening in a pipe and thus equalize any pressure differential across the sleeve. Hence, withdrawal of the sleeve 62 from a transverse opening through a pipe line after a stopping operation is greatly facilitated.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claim.

We claim:

A cylindrical pipe stopper adapted to be inserted into, and having a minimum outer diameter less than, a transverse circular opening through a pipe line and to be expanded into flow-stopping sealing engagement with the edges of the opening, comprising: a longitudinally-split expansible and contractible cylindrical sleeve; a plurality of longitudinal vanes spaced substantially uniformly circumferentially about and secured to the inner side of said sleeve; means carried by said vanes defining a set of inwardly-facing wedging surfaces adjacent each end of said sleeve; means carried by said vanes defining a set of outwardly-facing wedging surfaces adjacent each end of said sleeve; a jack screw disposed coaxially within said sleeve and having two threads of opposite direction; a pair of wedge nut means engaged with said threads for movement selectively away from or toward each other on rotation of said jack screw, each of said nut means having a convexo-frusto-conical surface engageable with a corresponding set of said inwardly-facing wedging surfaces and a concavo-frusto-conical surface engageable with a corresponding set of said outwardly-facing wedging surfaces, whereby engagement of said convexo-conical surfaces with said inwardly-facing wedging surfaces expands said sleeve substantially uniformly about its periphery and engagement of said concavo-conical surfaces with said inwardly facing wedging surfaces positively contracts said sleeve substantially uniformly about its periphery, at least one of said wedge nut means including a cap-like nut member having threaded engagement therewith for adjustment coaxially thereof and carrying the corresponding concavo-conical surface.

References Cited in the file of this patent

UNITED STATES PATENTS

| | | |
|---|---|---|
| 948,359 | Watson | Feb. 8, 1910 |
| 1,233,214 | Frew | July 10, 1917 |
| 1,431,658 | Hinckley | Oct. 10, 1922 |
| 1,624,465 | Black | Apr. 12, 1927 |
| 2,198,639 | Stines | Apr. 30, 1940 |
| 2,285,392 | Cline | June 9, 1942 |
| 2,655,339 | Smith | Oct. 13, 1953 |

FOREIGN PATENTS

| | | |
|---|---|---|
| 16,055 | Sweden | Aug. 5, 1902 |
| 259,221 | Great Britain | Mar. 17, 1927 |